United States Patent [19]

Beyl

[11] 4,158,377
[45] Jun. 19, 1979

[54] CAPTIVE SCREW DEVICE

[76] Inventor: Jean J. A. Beyl, 10, Boulevard Victor-Hugo, Nevers, Niévre, France

[21] Appl. No.: 817,726

[22] Filed: Jul. 21, 1977

[30] Foreign Application Priority Data

Aug. 6, 1976 [FR] France .................. 76 24029

[51] Int. Cl.² ........................................... F16B 41/00
[52] U.S. Cl. ......................................... 151/69; 145/46
[58] Field of Search ............................ 145/46; 151/69

[56] References Cited

U.S. PATENT DOCUMENTS

| | | | |
|---|---|---|---|
| 2,949,143 | 8/1960 | Shur | 151/69 |
| 3,189,077 | 6/1965 | Willis, Jr. et al. | 151/69 |
| 3,316,949 | 5/1967 | Canfield | 145/46 |
| 3,561,075 | 7/1969 | Selinko | 151/69 X |
| 3,571,904 | 3/1971 | Gulistan | 151/69 X |
| 3,679,266 | 7/1972 | Jenkins | 151/69 |
| 3,917,300 | 11/1975 | Salomon | 151/69 X |
| 3,967,049 | 6/1976 | Brandt | 151/69 X |

FOREIGN PATENT DOCUMENTS 128844 12/1969 Netherlands .................. 151/69

OTHER PUBLICATIONS

Wood and Huffins, "Captive-Screw Assemblies", *Machine Design*, Nov. 1960, p. 181.

*Primary Examiner*—Lowell A. Larson
*Assistant Examiner*—Kenneth J. Ramsey
*Attorney, Agent, or Firm*—Bierman & Bierman

[57] ABSTRACT

This captive screw device consists of a resilient retaining support for holding screws in predetermined positions in alignment with or within through holes formed in a member to be fastened by said screws to another member or a structure. Each support comprises a split socket or washer of which the central hole is either threaded or somewhat smaller than the diameter of the screw stem; overlying this hole is a tapered cup engageable by the screw head, and underlying this hole are a pair of legs adapted to clamp by snap engagement the member to be fastened; a plurality of such supports may be interconnected for retaining several screws in position; screwing the screws home will cause the screw head to engage said cup and expand the support so as to distort same and eventually break it, thus causing its ejection or at least facilitating its removal.

7 Claims, 12 Drawing Figures

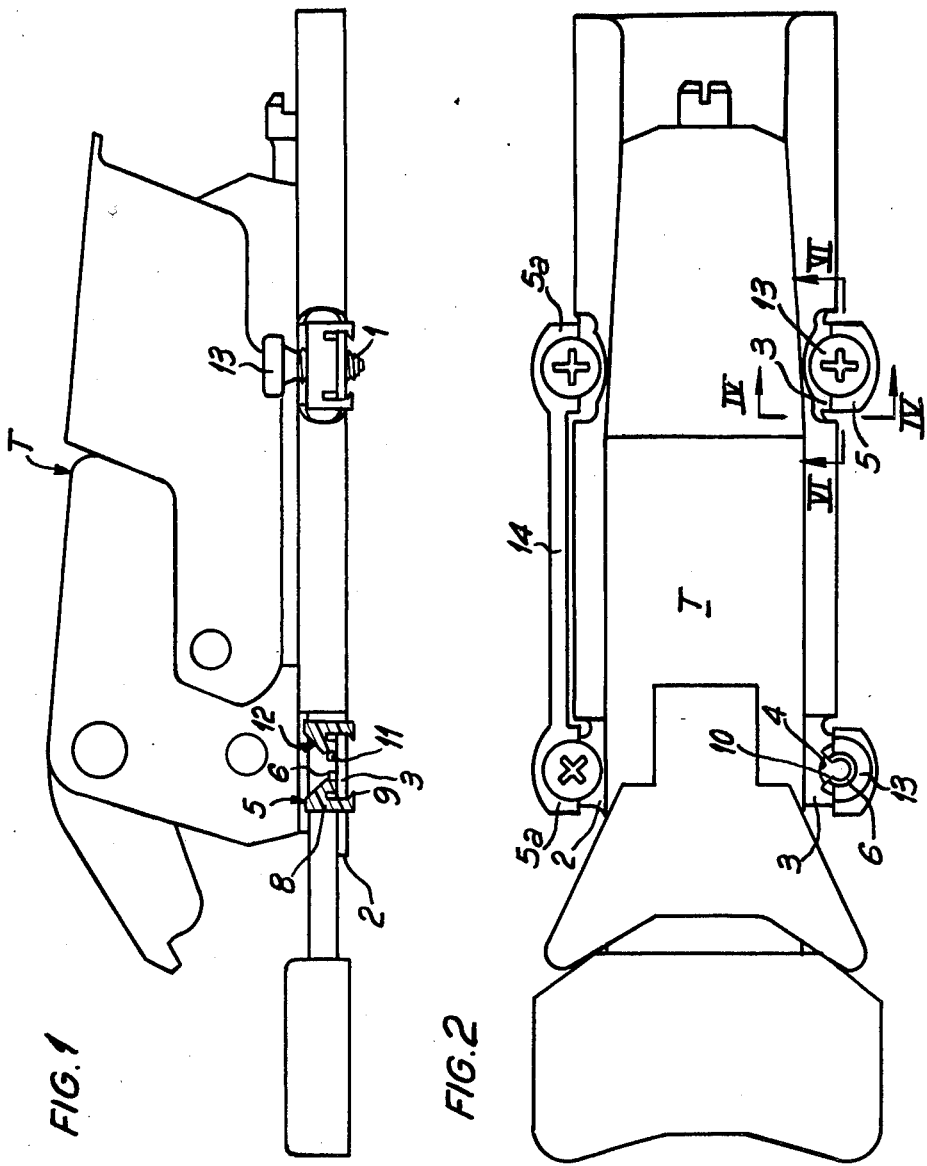

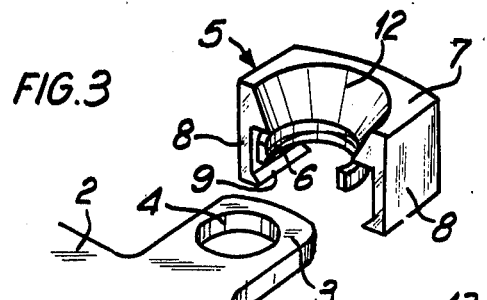
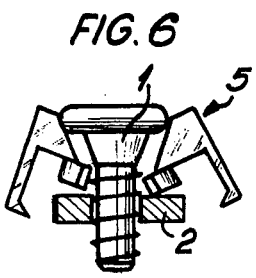
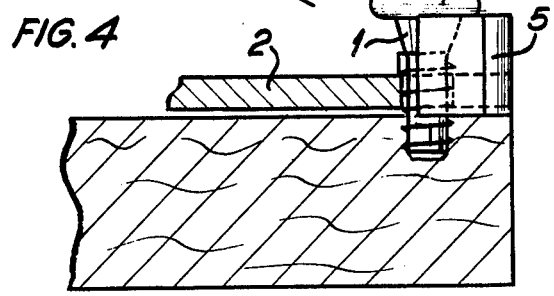
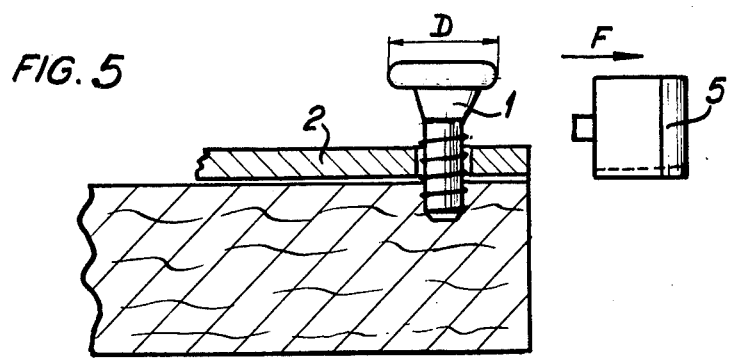
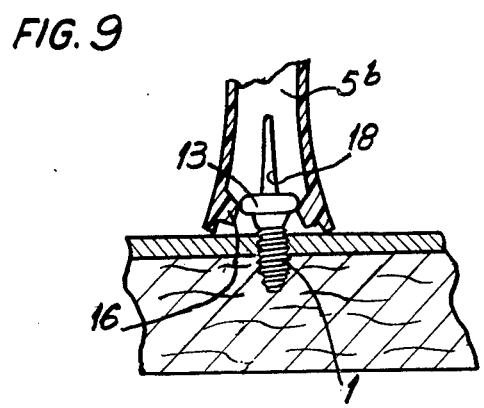

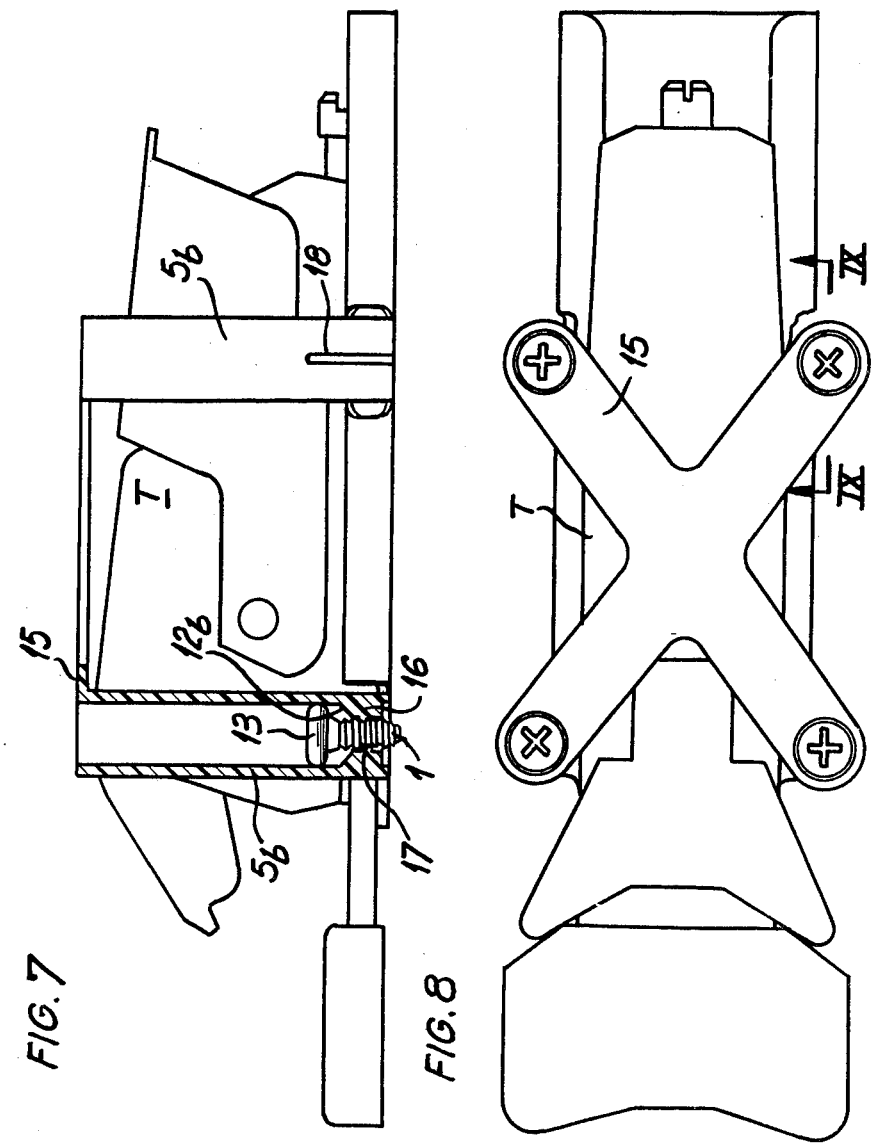

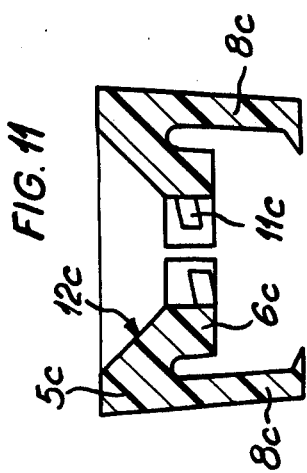
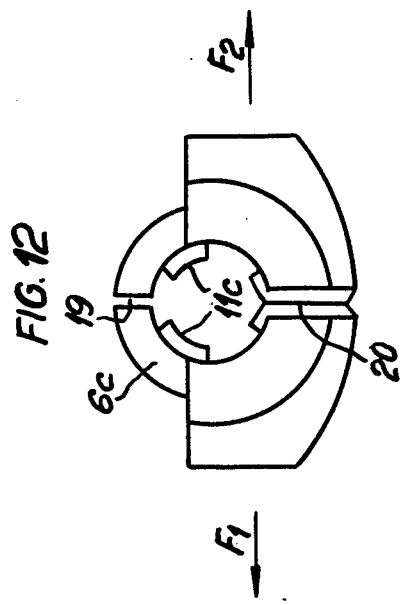
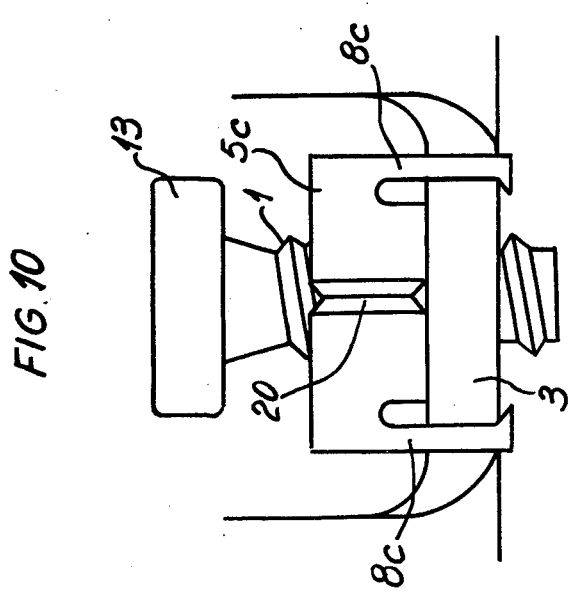

CAPTIVE SCREW DEVICE

BACKGROUND OF THE INVENTION

1. Field of the Invention

The present invention relates to a device adapted to retain in position fastening screws on a member or part adapted to be secured by means of said screws.

2. Description of the Prior Art

Many captive screw devices of this type have already been proposed. A number of them are illustrated in the "Machine Design" Nov. 10, 1960 issue (page 181). The Dutch patent No. 128,844 also discloses a device adapted to retain in position a screw on a part or member, before utilizing this screw for fastening the part or member to another structure or member.

The use of captive screw devices of this type enables manufacturers of a given article to dispose beforehand the number of screws necessary for the subsequent fastening of this article. Thus, this last or fastening operation is greatly facilitated since the final user is not compelled to care for the necessary fastening screws, and for the positioning of these screws in the corresponding holes of the article to be fastened. Therefore, the use of such screw retaining devices on a growing number of articles such as electrical apparatus, some sanitary articles and also ski bindings is becoming increasingly popular.

However, it should be noted that many screw retaining devices now in current use comprise an element which remains subsequently interposed between the part to be fastened and its support. This is observed notably in the case of the device disclosed in the above-mentioned Dutch patent No. 128,844. In fact, this device comprises essentially a plastic washer in which the screw to be retained in position is retained by screw engagement. Now, this washer comprises an external flange engaging the surface of the corresponding member opposite the surface registering with the screw head. When fastening this member, this flange remains interposed between the member and its support, and this may constitute an inconvenience in many cases.

To avoid this inconvenience, a known proposal consisted in providing corresponding recesses in the corresponding member or part for disposing the retaining support or device associated with each screw therein. However, this solution is also objectionable in that these special recesses have to be formed within the member or part to be fastened, and that each retaining support has to be positioned in the relevant recess. This obviously entails a substantial increment in the cost of the articles or parts thus prepared.

SUMMARY OF THE INVENTION

It is therefore the essential object of the present invention to provide a captive screw of screw-retaining device capable of avoiding the inconveniences characterizing hitherto known devices of this type. Furthermore, this device is designed with a view to facilitate the initial placing of screws on the part or article to be provided with such screws. For this purpose, this device consists of retaining supports consisting each of a socket or washer in which one of the screws to be retained in position is adapted to be screwed.

However, the registering surfaces of each support and the corresponding screw head have such configurations that driving the screw into this support, during the screwing-in, for fastening the corresponding part or member, tends to expand this support. Now the latter comprises at least one longitudinal slit or an incipient line of rupture permitting the distortion of said support or possibly the rupture thereof in order to bring about the ejection or permit the removal of this support as the screw is screwed in.

Moreover, the retaining supports of the device according to this invention are adapted to keep the fastening screws in proper alignment with, or within, passage holes formed in the part or member to be secured. Besides, said supports advantageously comprise means adapted to maintain or retain them on the part to be fastened, until the corresponding screws are screwed in.

However, due to their subsequent ejection or removal, the retaining supports of this device cannot interfere in any way with the final fastening of the part or member to be fastened. Moreover, for the same reason, it is unnecessary to provide special recesses in this part or member.

On the other hand, due to their particular design, the retaining supports of the captive screw device according to this invention act somewhat like "chargers" for properly positioning the corresponding screw. In fact, these screws are to be fitted on the retaining supports before positioning the latter on the corresponding member or part. The retaining supports thus provided may be independent from each other. However, it is also possible to attach these supports to one another by means of suitable interconnecting elements.

Typical examples of possible forms of embodiment of the device according to this invention will now be described with reference to the attached drawings given by way of illustration, not of limitation. In the drawings:

BRIEF DESCRIPTION OF THE DRAWING

FIG. 1 is a side elevational view of a ski binding of which the fastening screws are retained in position, before use, by means of a device according to this invention;

FIG. 2 is a plane view from above of the same ski binding, and showing a modified form of the invention;

FIG. 3 is a perspective view of one of the retaining supports incorporated in the present device;

FIG. 4 is a fragmentary section taken along the line IV—IV of FIG. 2;

FIG. 5 is a view similar to FIG. 4 showing the ejection of the corresponding retaining support during the screwing-in of the screw previously retained by said support;

FIG. 6 is a fragmentary section taken along the line VI—VI of FIG. 2, showing the distortion of a retaining support during the screwing-in of the corresponding screw;

FIG. 7 is a view partly in section and partly in side elevation, showing another form of embodiment of the retaining support according to this invention, this device being intended for temporarily keeping in position the fastening screws of a ski binding;

FIG. 8 is a plane view from above of the device illustrated in FIG. 7;

FIG. 9 is a fragmentary vertical section taken along the line IX—IX of the FIG. 8;

FIG. 10 is a fragmentary elevational view of another form of embodiment of the device of this invention;

FIG. 11 is a sectional view showing one of the supports incorporated in this device, and FIG. 12 is a plane view from above of this support.

DESCRIPTION OF THE PREFERRED EMBODIMENTS

In the example illustrated in FIG. 1 to 6 of the drawings, the retaining device according to this invention is intended for maintaining temporarily in position the various screws 1 in view of their subsequent use for fastening a ski binding component, in this case a heel hold-down device T, to the top surface of the ski. This heel hold-down device comprises a base plate 2 adapted to be secured to the top surface of the corresponding ski. The longitudinal edges of this base plate 2 are provided with four outwardly projecting ears 3 each having a central hole 4 adapted to be engaged by a fastening screw 1.

The retaining device according to this invention comprises in this example four retaining supports each designated in the drawings by the general reference numeral 5. As shown more particularly in FIG. 3, each retaining support comprises an inner washer 6 adapted to fit round the stem of the relevant screw 1, and an external body 7 forming an integral part of said washer, the complete device consisting of molded resilient plastic material of suitable grade and composition. The external body 7 comprises a pair of lateral depending legs 8 adapted to facilitate the keeping in position of this retaining support on one of the ears 3 of base plate 2 of the heel hold down device T.

For this purpose, the distance between the legs 8 corresponds to the width of ears 3. Besides, the legs 8 project downwards beyond the level of washer 6 so as to engage the side walls of the corresponding ear 3, a retaining in-turned ledge 9 being provided on the lower end of each leg 8. Thus, each retaining support 5 is adapted to be secured by snap or clamping engagement to a relevant ear 3 of base plate 2.

As clearly apparent in the plane view of this support (FIG. 2), the retaining washer 6 comprises a notch or aperture 10 facing inwardly when the support is in its operative position. However, it may be seen that the washer 6 extends on more than one-half of the circle inscribed therein, and corresponds substantially to the circumference of the corresponding screw 1. Besides, a certain play exists between this screw and the retaining washer 6, and the inner wall of this washer 6 has a helical rib 11 formed therein which matches the screw threads. Therefore, this screw 1 can be engaged through the washer 6 and be retained thereby.

Overlying the washer 6 is a tapered cup 12 formed in the body 7 and adapted to receive the head 13 of screw 1. However, the screws contemplated have a cylindrical head with a diameter D slightly smaller than the diameter of said tapered cup 12, at its upper portion.

Considering the particular configuration of the retaining supports of this invention, it will be seen that they act not only as means for retaining each fastening screw but also as a kind of charger therefor. In fact, each screw is firstly inserted by screwing through one of the supports 5 and then these supports are anchored by snap fitting to the various ears 3 of base plate 2 of the corresponding heel hold-down device. This greatly facilitates the final engagement of the screws into the underlying ski.

However, the various screws 1 are safely retained in position on base plate 2 since they are screwed in the retaining washers 6 and the corresponding supports 5 are themselves safely held against movement due to the resilient engagement of legs 8 on ears 3.

To achieve this fastening procedure, the various retaining supports 5 are manufactured by molding from plastic material having a suitable elasticity. Besides, this elasticity is also necessary for producing the final ejection of the supports when the screws are driven or tightened for fastening the base plate 2 to the underlying ski, in the example illustrated.

For securing the heel hold-down device T to the ski surface S, it is only necessary to screw in the various screws 1 already positioned on the base plate 2. However, when screwing in these screws, the head 13 of each screw engages the upper tapered cup or cavity 12 of the corresponding retaining support 5. Due to the tapered configuration of this cavity and the presence of a notch or aperture 10 therein, the retaining washer 6 is expanded and this is attended by a distortion of the lateral anchoring legs 8, as illustrated in FIG. 6.

Therefore, the anchoring ledges 9 are released from the edges of the corresponding ear 3 and the pressure exerted by the screw head 13 eventually ejects the retaining support 5 outwards, as illustrated in FIG. 5. Then the operator may tighten the corresponding screw in position.

With this procedure, the various retaining supports 5 are removed completely upon completion of the fastening of the heel hold-down evice T. This avoids the shortcomings of certain known devices mentioned in the preamble of this specification.

As already mentioned in the foregoing, the retaining supports may be separate from one another. However, as shown on one of the longitudinal sides of heel hold-down device T, illustrated in FIG. 2, it is also possible to use retaining supports 5a similar to retaining supports 5 but interconnected by a longitudinal link 14. Possibly, all the retaining supports 5 required for fastening a same ski binding may be interconnected by providing connecting elements having the shape of an inverted U, which are disposed straddlewise on the corresponding heel hold-down device T.

FIGS. 7, 8 and 9 of the drawings illustrate another possible form of embodiment of the retaining device according to this invention. In this device, the supports consist of four vertical tubes 5b extending upwardly from the corresponding longitudinal sides of the heel hold-down device T. At their upper ends these four tubes are interconnected by a spider-like element 15, the complete support being manufactured by molding from a suitable plastic material.

The diameter of tubes 5b is such that the head 13 of the relevant screw 1 can slide freely therein. However, at their lower ends these tubes comprise a constriction 16 of which the inner wall carries a helical rib 17 matching the screw thread. Overlying this constriction is a tapered cup 12b similar to the tapered cup 12 of the preceding form of embodiment. On the other hand, at their bottom these tubes 5b comprise two or three vertical slits 18.

Under these conditions, when the screws 1 are screwed into the retaining support associated with the heel hold-down device T, their heads exert a pressure against the walls of the tapered cups 12b and the various portions of the lower end of each tube are spread apart from the slits 18 (see FIG. 9). Thus, the lower ends of these tubes 5b are released from the ears 3 of base plate 2 and permit on the other hand the free passage of the screw heads 13 until the latter engage the base plate 2. Then, the retaining device of this invention consisting of the spider 15 and the various tubes 5b can be removed as a unit.

FIGS. 10, 11 and 12 of the drawings illustrate a further form of embodiment of the captive screw device of this invention. In this exemplary embodiment the retaining supports 5c are independent of one another as in the first form of embodiment shown in FIGS. 1 to 6. Besides, each retaining support has substantially the same structure as the support 5 of the first form of embodiment.

In fact, each support comprises a retaining washer 6c and a tapered cup 12c overlying said washer, the body of each support being also provided with lateral anchoring legs 8c. However, these retaining supports 5c differ from supports 5 in that the retaining washer 6c is circular, without any break.

On the other hand, this washer 6c has formed therein a tear-up line 19 adapted to constitute a line of incipient rupture, and the body of this support 5c comprises another weakened portion 20 adapted to play the same role, this support being manufactured from a material adapted to yield and break when a predetermined effort is exerted thereon.

Of course, the retaining washer 6c comprises as in the preceding example an inner helical screw rib 11c made of one or several sections, so that a screw 1 can be fitted and retained in this support before fitting the latter to one of the ears 3 of base plate 2.

In the present case, when the relevant screw is engaged in the base plate support the pressure exerted by the screw head 13 against the wall of cup 12c expands and breaks the support 5c, due to the provision of said weakening lines 19 and 20. Preferably, these two weakening lines are diametrally opposed to each other.

Thus, the retaining support 5c is subdivided into two portions which, when the screw 1 is screwed in, are ejected laterally in opposite directions as shown by the arrows F1 and F2 in FIG. 12. With this arrangement, the same result as in the case illustrated in FIGS. 1 to 6 is obtained, i.e. the complete removal of each retaining element when the corresponding screw is tightened home.

Of course, the retaining supports according to this invention should not be construed as being strictly limited by the specific and exemplary forms of embodiment described hereinabove with reference to the attached drawings. In fact, various modifications and changes may be brought thereto, notably as a function of the specific cases and applications contemplated, without departing from the basic principles of the invention as set forth in the appended claims.

Thus, in the forms of embodiment illustrated in FIGS. 1 to 6, on the one hand, and FIGS. 10 to 12, on the other hand, the lateral anchoring legs 8 or 8c may be replaced by other suitable elements capable of resiliently anchoring or temporarily holding against movement the corresponding retaining support on the member to be provided with fastening screws. On the other hand, the threads or helical ribs 11 may be dispensed with in case the retaining supports are made from a sufficiently resilient material permitting the impression of the screw thread into this material, and in this case it is only necessary to provide for the washer 6 (FIGS. 1 to 6) or constriction 16 (FIGS. 7 to 9) a cross section having a diameter slightly smaller than the outer diameter of the screw threads.

Besides, the specification refers only to the specific case of the use of the device of this invention for fitting captive screws in connection with a ski binding, but this should not be regarded as constituting the only possible application of the device of this invention, since said screw retaining supports can also be used with any other article, part, assembly or device to be provided with properly positioned screws intended for the subsequent fastening thereof to any other structure or member. Thus, these retaining supports may also be fitted to small electrical appliances or sanitary articles, etc.

I claim:

1. A captive screw device for attaching one member having an opening therethrough to a second member, said captive screw device comprising a screw having a head larger than said opening and means supported by said one member holding said screw in alignment with and above the opening in said one member, said means comprising a support formed of pressure-distensible material, notched on one side and having a downwardly tapered central opening therethrough surrounding said screw, the lower end of said tapered opening being of a diameter sufficient to support the body of said screw and the upper end of which is of a diameter sufficient to receive the headed end of said screw, whereby, as the body of said screw is moved downwardly through the aligned openings and into said second member, the head of said screw contacts the sides of said downwardly tapered opening and eventually distends said notched support to permit both engagement of the screw head with said first member and ejection of said support.

2. Retaining support as recited in claim 1, wherein a plurality of such holding means are interconnected by suitable links to constitute a unitary device for holding several fastening screws.

3. Retaining support as recited in claim 2, wherein a plurality of such holding means are assembled into a unitary device for holding several screws, each support having the shape of a tube, the tube ends opposite the screw-containing ends being interconnected by link or spider means adapted to overlie the member through which the fastening screws are to be inserted, the tube ends containing said fastening screws being provided with slits permitting their distortion when said screws are screwed home.

4. A captive screw device for attaching one member having an opening therethrough to a second member, said captive screw device comprising a screw having a head larger than said opening, and means supporting said screw in alignment with and above the opening in said one member, said means comprising a support formed of pressure-distensible material, notched on one side and having a downwardly tapered central opening therethrough surrounding said screw, the lower end of said tapered opening being of a diameter sufficient to support the body of said screw, and the upper end of which is of a diameter sufficient to receive the headed end of said screw, whereby, as the body of said screw is moved downwardly through the aligned openings and into said second member, the head of said screw contacts the sides of said downwardly-tapered opening and distends said notched support so that this distortion is followed by a rupture which either causes the ejection of said support, or at least permits its easy removal.

5. A captive screw device according to claim 4, in which said support is provided with a downwardly extending portion having at its lower end an inward extension normally gripping the underside of said one member, whereby distension of said support moves said downwardly extending portion outwardly and releases said support from said one member.

6. A captive screw device according to claim 5, in which the notched section of said support comprehends less than one half of the circumference of the support and of the tapered opening therethrough.

7. A captive screw device according to claim 4, in which said support is notched on diametrically opposed sides in the form of incipient rupture lines.

* * * * *